United States Patent Office 2,981,308
Patented Apr. 25, 1961

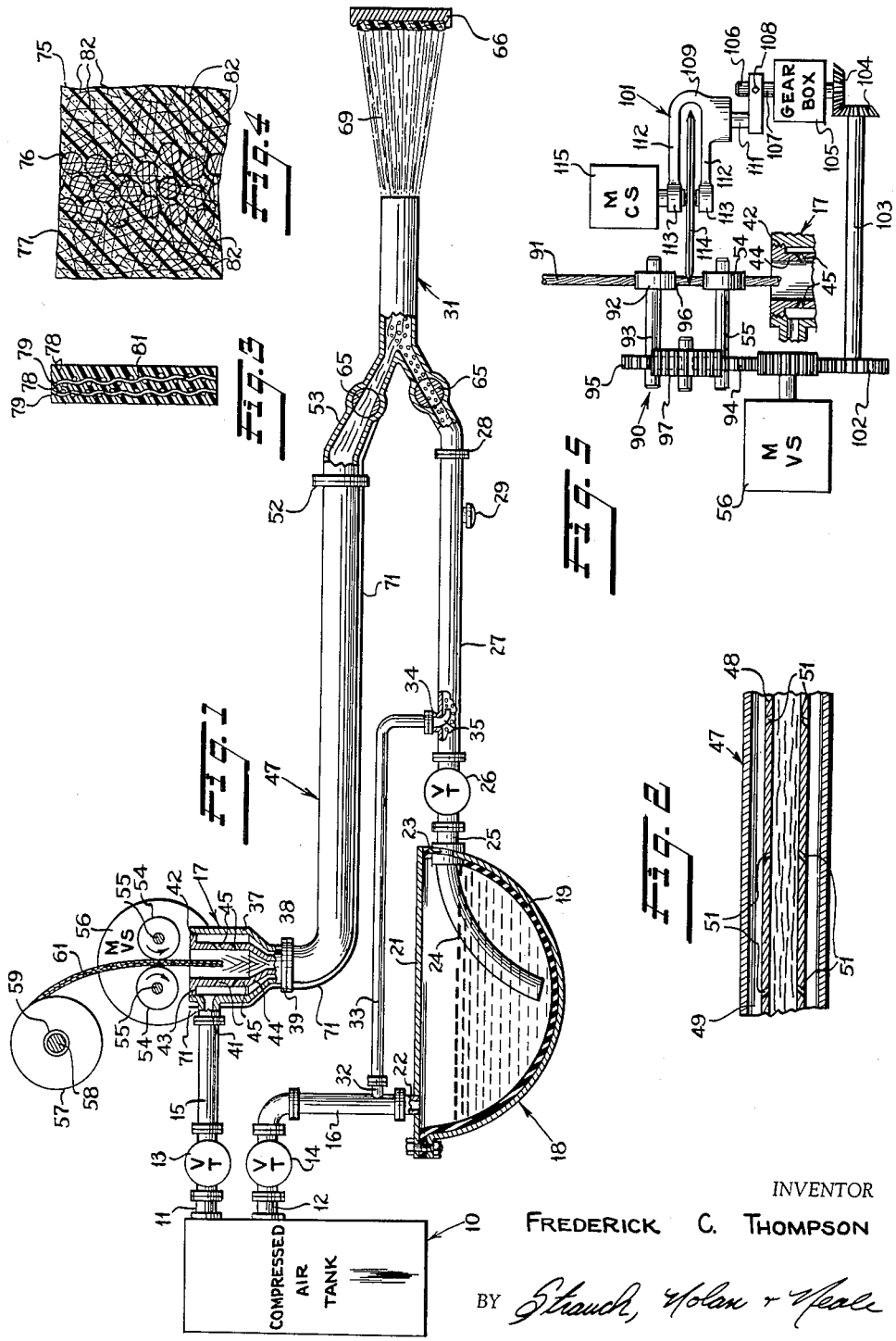

2,981,308

APPARATUS FOR PRODUCING REINFORCED PLASTIC, RESINOUS OR LIKE STRUCTURAL BODIES, FORMS, LININGS AND COATINGS

Frederick C. Thompson, Washington, D.C., assignor, by direct and mesne assignments, of sixty percent to George F. Shea, Washington, D.C., thirty-five percent to Januarius A. Mullen, Grosse Pointe, Mich., and five percent to J. Matthews Neale, Chevy Chase, Md.

Original application Mar. 31, 1953, Ser. No. 345,762, now Patent No. 2,850,421, dated Sept. 2, 1958. Divided and this application Jan. 31, 1958, Ser. No. 714,456

9 Claims. (Cl. 154—1)

The present application is a division of applicant's application Serial No. 345,762 filed March 31, 1953 (now Letters Patent Number 2,850,421) and is directed to the therein disclosed apparatus for producing reinforced plastic cementitious and resinous and like structural bodies and forms and particularly to an overall assembly of apparatus for combining a plastic, cementitious, viscous, resinous or like vehicle and fibrous reinforcing materials in predetermined proper proportions and projecting them forcefully against a form, mold, object or the like of suitable characteristics to build up plastic reinforced structural bodies, forms, linings, or coatings of desired shape, strength and thickness for the use intended.

Heretofore in the art of forming plastic and reinforced resinous structural bodies and linings or coatings, it has been necessary to provide very expensive matching pressure molds or dies, to line said molds or otherwise incorporate into the molds or dies sheet-like reinforcing fibrous material or cloth, then flow the resinous or plastic vehicle around and through the fibrous material and actuate the molds or dies to squeeze out the excess resin or other vehicle to form a reinforced unitary body. In addition to the expense of the necessary matched forming dies, the necessity of weaving, spinning or matting the fibrous material into desired sheet form and the cost and difficulties encountered in handling the fibrous reinforcing materials and incorporating the plastic or resinous material in proper manner with the reinforcing fibers, these prior art practices have not resulted in a uniformity or controlled proportioning of the fibrous material to assure a desired uniform structural strength and rigidity or provided a suitable means for forming uniform reinforcing sheets or inexpensively and rapidly providing reinforced plastic or like products. Furthermore, the prior art methods cannot be accurately mechanically controlled and the quality of product is subject to the skill of the particular operator. For these reasons the prior art methods and apparatus for forming reinforced plastic and like bodies have not been as widely used in industry as its potentialities suggest is desirable and the usage of reinforced plastic and like bodies, forms, linings and coatings has not made the headway in fields, such as the automotive, aircraft, boat and structural building fields, requiring products of intricate shape that might be expected because of the desirable wear, rust, corrosion and heat resistant and non-conductivity characteristics of such plastic or like materials.

It is, accordingly, the primary object of the present invention to provide suitable apparatus for storing in usable condition plastic, resinous, or like vehicles and fibrous reinforcing material and flowing the plastic or like vehicle and fibrous reinforcing material along separate paths to a point of juncture where the vehicle and material are combined in proper proportion while still flowing towards a point of discharge and discharging the combined aggregate from a nozzle-like member against an open faced mold, or a form or object at a desired rate to secure the desired structural thickness for a resulting reinforced plastic, or like body, structural form, lining or coating.

Another object of the present invention resides in the provision of novel mechanism for feeding predetermined quantities of fiber at reliably controllable rates to an apparatus for uniformly intermixing and distributing the fibers to and throughout a binder material in a continuous method of producing fiber reinforced products.

Other objects of the invention will appear as the description proceeds in connection with the appended claims and attached drawings wherein:

Figure 1 is a schematic view of one form of apparatus for carrying out the method of this invention and illustrating one way in which the method may be employed to produce a reinforced plastic, resinous or like body or product;

Figure 2 is a fragmental, longitudinal sectional view of the conveyor hose for separating and carrying the reinforcing fibers of predetermined length to the discharge nozzle for preliminary coating and final discharge with the plastic, resinous, or like constituent into the mold or form for shaping and forming the reinforced product;

Figure 3 is a fragmental sectional view through a reinforced resinous, plastic or like product made in accordance with the prior art practices now in use and illustrating in an exaggerated manner the layered distribution of the reinforcing fibers obtained in use of the present day prior art methods;

Figure 4 is a view similar to Figure 3 through a reinforced resinous, plastic or like product made in accordance with the method of this invention and illustrating the uniform, homogeneous distribution of reinforcing fibers obtained by use of the method of the present invention; and Figure 5 is a schematic view illustrating a modified fiber feed and cutting means adapted for use in place of the fiber feed means of Figure 1 in order to assure the production of uniform length fibers from continuous rope-like strands of fiber.

With continued reference to the drawings illustrating presently preferred forms of apparatus for practicing the method of the invention of Letters Patent 2,850,421 using either a ribbon-like assemblage of individual fibers or a rope-like fiber strand as a source of material, like reference numerals are used to indicate the same parts throughout the several views. Irrespective of the initial source of fiber reinforcing material, the present invention contemplates as an initial step the separation of the fibrous material into individual fibers cut to uniform length and the introduction of the individual fibers into a conveyor stream of fluid, such as air, flowing generally in the direction of a point of discharge but augmented at intervals of about a foot by converging jets of air discharging generally in a downstream direction. These air jets act on the fibers in a manner to separate one strand from another and the fluid stream floats the fibers substantially endwise in the direction of fluid flow at a speed dependent upon the rate of flow of the fluid stream.

Of extreme importance to the success of this invention is the uniformity in length of the fibers and the separation of the fibers into individual fibers travelling along with the conveyor stream of fluid in parallel spaced relation to one another. Such handling of the fibers assures accurate control of the rate of deposit of the fibers relative to the plastic, resinous, or like binder material and, as a consequence, the even distribution of reinforcing fibers throughout the finished product in predetermined density to provide a product of desired structural strength in every direction.

While the present invention is suitable to produce fiber reinforced products of striking uniformity in structural strength from many different kinds of fibers and binders, it is particularly adapted for producing fiber reinforced plaster, resinous, plastic, rubber, cementitious and like products, even reinforced paint, asphaltic and bituminous coatings in either small or large sizes and of very thin or very thick cross-sectional area or widely varying cross-sectional area. It may be used with equal facility for producing vehicle bodies, panels and the like, such as resinous automobile, boat or aircraft bodies or panels, cementitious or plaster building walls, roofs and floors, plastic, rubber or resinous linings, coatings, tanks and pipe lines for use in conveying or storing corrosive fluids or combatting rusting and erosive action in underground installations. By controlling the nature of the binder and relative proportions of reinforcing fiber and binder, products of widely varying physical characteristics can be readily and rapidly produced in continuous or non-continuous form merely by controlled relative movement of the mold or patterns and apparatus of this invention. Varying widths of products can be readily produced by side-by-side disposition of two or more discharge lines individually controllable to selectively cut them in or out of operation. The reinforcing fibers may be glass fibers, cotton, wool or other vegetable fibers, mineral fibers or chemically or mechanically produced fibers having the property of imparting strength to a product when incorporated in a binder material of the character heretofore mentioned.

Particularly desirable products producible by the method and apparatus of this invention are glass fiber reinforced resins of the polyester, polyvinyl, polyethylene groups. The method and apparatus are equally usable for resins which cure readily at normal temperatures or those requiring heating since the molds or patterns can be movably supported on conveyors for passing the molds past the discharge lines of the apparatus of this invention and then to a curing room or curing furnace as circumstances may require.

A particular application of this invention to produce a reinforced resin contemplates a source of compressed air such as a compressor tank 10 containing compressed air at a suitable pressure, namely, approximately 35 pounds per square inch. Tank 10 contains a pair of outlets 11 and 12 connected through suitable throttle valves 13 and 14 and pipe lines 15 and 16 respectively to a fiber receiving hopper 17 and a tank 18 containing a suitable resin in commercially available liquid form. Such a resin may be one of the "Paraplex" P series of resins obtainable from the Rohm and Haas Company of Washington Square, Philadelphia, or "Bakelite" styrene, "Vinylite" and phenolic resins and acrylonitrile copolymers and polyethylene coatings obtainable from the Bakelite Company, 30 East 42nd Street, New York.

As clearly seen in Figure 1, tank 18 is preferably in the form of a large metal kettle having an inner liner 19 of flexible rubber or the like and an open top closed by an air tight cover 21 having a pipe connection 22 suitably formed for connection to pipe line 16. Tank 18 at a point near its top edge is provided with an outlet pipe 23 and connected at one end to a curved pick-up tube 24 extending to the bottom of the tank and at its other end to an outlet fitting 25. Outlet pipe 23 is suitably mounted in the wall of tank 18 to assure an air tight connection with the tank wall. A suitable throttle valve 26 is interposed between outlet fitting 25 and a tube or hose 27 leading to and suitably connected to an inlet connection 28 of a combined resin and fiber entraining and discharge nozzle 31 to be hereinafter described in more detail. Adjacent its end connected to nozzle 31 tube or hose 27 is provided with a capped inlet fitting 29 which may be connected through a suitable pick-up hose (not shown) to a source of supply of a suitable plasticizer or accelerator material to control the curing time or a suitable foaming agent provided if a fiber reinforced light weight aerated product is desired. While the aspirating effect of the resin stream alone can be relied upon to incorporate such additives at connection 29 by suitable well known mechanical means, pressure injection of the additives may also be accomplished here if desired.

Compressed air pipe line 16 just ahead of tank inlet connection 22 has a by-pass connection 32 of reduced diameter which is connected to an air line 33 leading to a fitting 34 extending from a side of tube or hose 27. Fitting 34 is adapted to receive an air nozzle 35 in the form of an elbow having its discharge end facing toward the discharge end of tube or hose 27 for a purpose to be hereinafter pointed out.

As clearly seen in Figure 1, fiber hopper 17 comprises an outer wall 37 having an inwardly sloping bottom wall 38 terminating in an outlet fitting 39 and a right angularly disposed inlet fitting 41 connected to compressed air line 15. The upper end of wall 37 is interiorly threaded as at 42 to threadedly receive the annular flange 43 of an inner wall member 44 of similar shape but substantially smaller dimensions than outer wall 37 forming therebetween an annular air chamber. At diametrically oppositely spaced points, inner wall member 44 in close axially spaced relation is provided with converging inwardly directed jet openings 45 arranged to direct intersecting jets of air generally in the direction of outlet 39 from the opposite sides of the hopper. The adjacent discharge ends of outer wall 37 and inner wall 44 are respectively suitably connected to outer tube or hose member 47 and inner tube or hose member 48 (Figure 2) defining between them an axially extending annular air chamber 49 in communication with the air chamber of hopper 17. At spaced intervals of approximately one foot along inner tube or hose member 48 is provided with inwardly and forwardly directed opposed jet openings 51 leading from annular chamber 49 to the interior of tube or hose member 48. At its end remote from outlet connection 39 annular chamber 49 terminates in an outlet connection flange 52 which suitably connects the interior of tube or hose member 48 to inlet connection 53 of discharge nozzle 31.

Directly above hopper 17 in opposed relation on either side of a vertical plane containing the center line of the hopper, the present invention provides a pair of cooperating fiber feed rolls 54 mounted to rotate with drive shafts 55 suitably journalled in a manner not shown and driven in any suitable manner at uniform speed in opposite directions as shown by the arrows from a variable speed motor 56.

While any suitable fiber material may be fed to hopper 17 by feed rolls 54, the embodiment of the invention disclosed in Figure 1 contemplates use of a band of glass fibers of predetermined width in which the fibers are arranged lengthwise from side to side of the band and held together by a light binder such as a heavy starch or light resin coating sometimes known as "roving." Such a material is readily available on the market in the form of a roll of substantial width wound on a hollow core and can readily be cut to suitable width by well known cutters adapted to cut transversely through the roll. A band of suitable width cut from such a roll is shown at 57 in Figure 1 rotatably supported on a spindle 58 by means of the hollow core section 59. The free end 61 of the band of glass-cloth is inserted between rollers 55. The rollers are then operable to draw the free end 61 between them unrolling the fiber material and feeding it continuously between the opposed air jets 45 in hopper 17.

With the apparatus of Figure 1 fully described, the process of this invention is carried out in the following manner:

Tank 18 is filled with the desired amount of selected material and a roll of the selected reinforcing fiber material is placed on shaft 58 and its free end is placed in feeding position between feed rollers 54. Throttle valves 13 and 14 are then opened and regulated to assure the desired flow of compressed air through lines 15, 16 and 32 and the tubes or hoses 27 and 47 and nozzle 31. Valve 26 being closed at this stage and motor 56 not being in operation, air only will be discharged from nozzle 31, assuming control valves 65 therein are open as shown in Figure 1, and suitable adjustment of the air valves 13 and 14 to assure proper air flow along the two operating lines may be readily effected and checking of the equipment for undesired leaks can be readily accomplished.

Depending upon the desired characteristics of the reinforced product desired, the speed selector (not shown) of motor 56 may be set to assure the desired rate of flow of the reinforcing fiber into hopper 17. The equipment now being ready for operation, the mold, or form 66 to be filled or coated is placed in proper position opposite the discharge end of nozzle 31. In this connection, it is to be understood that mold or forms 66 may be vertically disposed as illustrated or may be horizontally or angularly disposed beneath a nozzle 31 arranged for vertical or angular discharge. The critical factors in this connection are that the area of the mold or form to be filled or coated be disposed at such a distance from nozzle 31 that the full area of the discharge spray pattern from nozzle 31 be uniformly distributed over the mold or form surfaces to be filled or coated and that the mold or form be substantially perpendicular to the axis of the discharge opening of nozzle 31.

If the mold or form has a large transverse dimension, two or more units of equipment should be mounted in side-by-side relation transversely of the mold with their respective nozzles 31 disposed equally distant from the opposite mold or form surfaces so that the peripheral areas just touch or overlap just sufficiently to assure equalized application of material along the line of juncture of adjacent spray patterns. The proper arrangement of nozzles in this respect can be determined either by calculation of the rate of discharge from nozzles 31 or by trial it being borne in mind that a thickened longitudinal area along the line of juncture in most cases would not be objectionable since the finished face lying against the mold or form will always accurately conform to the surface of the mold or form. Usually a mold or form 66 having a large transverse dimension would also have an even larger longitudinal dimension. This poses no problem insofar as the present method and apparatus is concerned since the mold or form 66 may in such a case be mounted on a suitable conveyor mechanism (not shown) to be moved past the nozzles 31 at a predetermined desired constant or variable rate of speed or swivel joints of suitable well known construction may be interposed in tubes or hoses 27 and 47 to permit a constant or variable sweeping movement of the nozzles relative to the mold or form 66.

With the apparatus adjusted and mold or form readied for operation as heretofore pointed out, control valve 26 is opened and binder material control valve 65 of nozzle 31 is positioned to connect tube or hose 27 with the outlet of nozzle 31. The contents of tank 18 being under pressure from compressed air tank 10 will then be forced up through pick-up tube 24 and along tube or hose 27, the operation of this portion of the apparatus being similar to that of the well known conventional paint guns. Compressed air introduced through nozzle 35 adds its propulsive effect to the binder material in tube or hose 27 to assure continuous flow of binder material at a uniform high rate through hose 27 and out of nozzle 31 in a pattern somewhat like that shown at 69.

At the same time that binder control valve 65 is opened, fiber control valve 65 is also opened and through an electrical contact on its stem (not shown) and control wire 71 carried by tube or hose 47 energizes motor 56 to drive feed rolls 54 to feed the fiber band 61 into hopper 17 between air injection nozzles 45 at the predetermined desired rate of speed. The jets of air from nozzles 45 effectively separate the individual uniform length fibers from the end of band 61 and flip them into parallel relation to the flow of the air stream which carries the fibers into and along inner tube or hose 48 inside of hose 47. The resulting stream of air and individual fibers in hose 48 are successively augmented by the jets of air from nozzles 51 assuring relatively high speed delivery in a substantially uniform stream of the individual fibers to nozzle 31. At nozzle 31 the fibers are injected, partly due to their own forward momentum and partly due to the aspirating effect of the stream of binder material, into the binder material where they become individually precoated, entrained into the stream of binder material and then pass from nozzle 31 in the form of a composite discharge stream of fiber entrained binder material which is projected into or on the mold or form 66.

Since a predetermined proportioning of the binder material and fibers is effected by varying the feed speed of rollers 54, any desired ratio of binder material and reinforcing fibers can readily be obtained. Furthermore, since the reinforcing fibers and binder material are simultaneously projected into or onto the mold 66 in the predetermined selected ratio and the fibers are individually precoated in passing through nozzle 31, a very exacting uniformity of distribution of binder material and reinforcing fibers is assured throughout the resulting product. Furthermore, since the fibers at the time they are projected against mold 66 are bendable and are projected endwise, the fibers will be distributed in such a way that they will lie in every conceivable relative position throughout the resulting product as clearly illustrated in Figure 4 of the drawings.

In event additional plasticizer or some other additive is required for a particular product or a particular portion of a product, the present method and apparatus readily meets the situation in that hose inlet 29 may be connected to a source of the desired additive which can be introduced into the stream of binder material either by means of the inherent aspirating effect of the flowing stream or by position pressure injection. This feature of the apparatus and method is particularly advantageous in event a sandwiched insulating layer may be desired in a unitary structure as depicted in Figure 4. If such a product is desired relative movement of nozzle 31 and mold or form 66 would be arranged for step-by-step movement, the dwell or relative non-movable interval being of sufficient duration to allow the desired thickness to be built up. The first period of this interval could then be utilized in the manner just described to build up a solid outer layer 75 (Figure 4). When layer 75 reaches its desired thickness, a suitable foaming agent for the particular binder material being used, preferably a delayed action foaming agent capable of reacting after being deposited to expand the deposited material into a cellular gaseous filled mass, might then be introduced through inlet connection 29 to produce the intermediate sponge-like layer 76 and then the final period of dwell could be used to build up a backing layer 77 identical to layer 75. The three layers being completed over a desired transverse section of the mold or form, a relative movement between nozzle 31 and mold or form 66 sufficient to expose the next adjacent transverse section of the mold or form would then be effected.

A unique feature of the operation just described would be the production of an intermediate trussed honeycomb layer of thin walled bubbles of binder material crisscrossed by coated fibers unitarily secured to the opposite bubble walls of individual bubbles and also secured to the walls of adjacent bubbles. Certain of these trussing fibers, irrespective of whether the resulting product were subjected to compressive forces, shear forces or tensional forces or a combination of such forces, would be under tension and act to reinforce the natural structural resistance of the bubble walls themselves. An effective thermal insulating panel fiber reinforced throughout and having solid opposite face layers can, therefore, be readily produced by this method and apparatus.

Even if the sponge-like layer be omitted and a solid product of uniform cross-sectional characteristics were to be formed, i.e., a product throughout like layer 75, the product of the present invention would still be novel and have characteristics and advantages not previously exhibited by present day reinforced plastic, resinous, cementitious, bituminous, or like products. To illustrate this fact, Figure 3 of the drawings, depicting more or less diagrammatical the cross sectional appearance of such fiber reinforced products made according to present day laminating methods, may be compared with Figure 4.

Referring first to Figure 3, it will be noted that a cross-sectional analysis of present day products discloses alternating layers 78 of pure binder material unreinforced and reinforcing woven or matted regularly spaced layers 79 of fiber reinforcing material interspersed with right angularly disposed areas 81 of structurally weak binder material. Shear forces, directly applied endwise of the product or due to bending of the product, at all areas except for the strata 79 containing the fibers are resisted solely by the binder material.

Referring to the product shown in Figure 4 which results from this invention, and particularly to the face areas 75 and 77 which represent the structure of conventional solid products, it will be seen that the fibers 82 are heterogeneously interspersed throughout the binder material. As a consequence, no matter what direction stress forces are applied there will be tensioned fibers to resist the forces. It will be appreciated, therefore, that not only is the product of this invention a superior product from a structural strength standpoint but is a product which can be made in any desired areas and thickness rapidly and with much less difficulty and apparatus than presently required.

Referring now to Figure 5, there is shown a modified form of fiber feed mechanism 90. The mechanism 90 is particularly useful in connection with synthetic extruded fibers of indeterminate length, such as glass fibers, made up into a rope-like strand 91 and held together, if necessary, with a light binder material such as starch or light resin coating. Since one of the critical features of this invention is the regulation of the ratio of fiber to binder material in the final product, feed mechanism 90 includes in addition to feed rolls 54 carried by shafts 55 and driven by motor 56 a second set of feed rolls 92 carried by shafts 93 in vertically spaced relation to feed rolls 54 and driven from gears 94 of shafts 55 through a transfer gear 97 to gears 95 on shafts 93. While the two sets of feed rolls 54 and 92 may be arranged to feed rope-like strand 91 downwardly toward hopper 17 at the same rate of speed, the gear ratio between gears 94 and 97 is preferably such that the feed speed of rollers 92 is just a slight bit slower than that of 54 with the result that the section 96 of strand 91 is tensioned between the rollers for a purpose that will presently appear.

Feed mechanism 91, also includes a cutter mechanism 101 reciprocatively driven toward and away from the path of strand section 96 from motor 56 through a spur gear 102, shaft 103, bevel gear set 104, speed reduction gear box 105, splined shaft 106 and a crank arm 107 splined to shaft 106 for adjustable positioning therealong by means of set screw 108. Mechanism 101 includes support member 109 fixedly carried on crank arm 107 by shaft 111 and having horizontally extending, vertically spaced support arms 112 terminating in bearing sockets 113 adapted to rotatably mount a rotary disk cutter 114 and a light low horsepower constant speed motor 115 arranged to impart rotary movement to disk cutter 114.

Feed mechanism 91, due to its common variable speed drive motor 56 and the fixed ratio gearing arrangement, assures the cutting of strand 91 to a predetermined length established by a selected mounting of crank arm 107 on shaft 106 irrespective of the speed at which motor 56 is set to feed strand 91 to hopper 17. Accordingly, the ratio of fiber to binding material desired having once been determined, it is only necessary to set cutter mechanism 101 at the proper point on shaft 106 to secure the desired fiber length in relation to the available speed variations of motor 56 and select the desired speed for motor 56. If then a variation from this ratio is desired within the limits of the speed adjustment of motor 56 adjustment of the motor speed alone will suffice.

Since cutter mechanism 101 swings disk cutter 114 in and out between feed rolls 54 and 92, there is a tendency to thrust strand section 96 to the left. If this section were not tensioned as previously suggested, instances might arise when no cut or an incomplete cutting through would result. It is for this reason that feed rolls 54 and 92 are preferably arranged for creating a tension in strand section 96.

Once the desired length of strand 91 is severed by cutter mechanism 101, the freed end will pass through rollers 54 into hopper 17 and the individual fibers will be torn apart by the air jets from nozzles 45 as previously described and fed through hose 47 to produce the reinforced products as hereinbefore pointed out.

A suitable cleaning solvent can be supplied to tank 18 and run through the hose line 27 and nozzle 31 to clean it. In event use of such a solvent is delayed until the binder material adhering to line 19, hose line 27 and nozzle 31 has hardened it will be also appreciated that flexible liner 19 of tank 18 permits ready cleaning since the hardened coating of binder material may be broken up by flexing the liner. Also ready cleaning of pick-up tube 24 and hose 27 may be effected, if these members are also made of flexible hosing material, since flexing of the tube 24 and hose 27 will break the internal coating of binder material loose also. These broken fragments of binder material may be readily removed from liner 19 and tube 24 by merely removing these parts and dumping them. Upon reassembly of these cleaned parts and replacement of tank cover 21, opening of valve 14 can be effected to supply compressed air to hose 27 to remove binder fragments therefrom. Also cleaning of hopper 17 and hose 47 may be readily effected merely by shutting off motor 56 and opening air valve 13 to send a stream of clean air through the hopper and hose. Nozzle 31 will, of course, have to be cleaned in any of the well known ways now employed to clean paint spray nozzles.

It will be appreciated that the apparatus of this invention is not only simple and readily maintainable for use but is extremely versatile in use since almost any conceivable ratio of fiber to binder or coating material can be obtained by proper adjustment of throttle valves 13, 14 and 26 the speed of motor 56 and manipulation of nozzle valves 65. For exmple, if a face layer of pure resinous or other binder material is desired, fiber hose control valve 65 may be closed to shut off flow of fiber through nozzle 31, the closing automatically through control wire 71 cutting off the feed of fiber to hopper 17. The air entering hose 48 would then merely build up pressure within the hose to the 35 lbs. per square inch or back out of hopper 17 with no harmful effects.

If a colored surface were desired, the suitable pigment could be premixed in the tank 18 in conventional manner or in many, if not all, cases could be introduced into the binder material through inlet connection 29. Since liquids passing through a hose and nozzle, such as nozzle 31, and discharged through the air tend to readily intermix, pigment introduced in liquid form through connection 29 either premixed with a suitable thinner or without premixing, if that is preferred, should be intimately mixed with the binder by the time the discharge of nozzle 31 is deposited in mold or form 66.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for producing an article composed of reinforcing fibers and suitable binding material comprising an air tight tank for receiving a supply of suitable fluid binding material and having a removable top cover and an inlet opening to the interior at a point normally above the level of binder material therein and an outlet through which said binder material may flow; a hose line connected at one end to said outlet and adapted at its other end for connection to a discharge nozzle; a second hose line terminating at one end in a receiving opening and adapted at its other end for connection to a discharge nozzle; a source of compressed air connected to said tank inlet and to said one end of said second hose line and adapted to respectively place the contents of said tank under pressure to force said binder material in the form of a stream out of said tank outlet and along said first mentioned hose line from said one end to said other end and to create a flow of air through said second hose line from said one end to said other end; means for introducing individual fiber strands of uniform length into said receiving end of said second hose at a controlled rate thereby forming a stream of flowing fiber ladened air in said second hose; and a three way nozzle having one passage connected to said first hose line and a second passage connected to said second hose line and arranged at an angle to said first passage so as to merge said fiber ladened stream and said stream of binder material together in the nozzle precoating the fibers and forming a fiber interspersed stream of binder material to be discharged from said third nozzle passage to be deposited in any desired manner to form a fiber interlaced binder material which will set or cure into a homogeneous structurally reinforced product.

2. The apparatus of claim 1 wherein the second hose line is made up of inner and outer tube-like members forming therebetween an annular space communicating with said source of compressed air and said inner member at spaced intervals along its length is provided with opposed nozzle-like openings converging inwardly and forwardly toward the center thereof whereby inwardly and forwardly directed jets of air having a forward propulsive force are repeatedly and successively directed against said fibers to maintain the fibers in separated relation and the velocity of the flowing stream of air at a maximum.

3. The apparatus of claim 1 wherein said air tight tank comprises a bowl-like body having an outlet connection at one point adjacent its upper edge; a flexible liner formed to cover the interior of said body and having an annular flange at its outer edge overlapping the upper body edge; a removable cover provided with an inlet connection and adapted to overlap the upper body edge and annular flange; and means cooperating with said body and cover to draw said cover and body into sealing engagement with said annular flange between their opposed sealing surfaces.

4. The apparatus of claim 1 together with an inlet connection in said first mentioned hose line whereby plasticizer, thinner, coloring pigment, foaming agents or like additives may be selectively introduced into said stream of binder material.

5. The combination of claim 1 together with a by-pass air line between said source of compressed air and said one end of said first mentioned hose line to supply air directly to said first mentioned hose line at its center to aid in securing smooth regular flow of binder material through said first mentioned hose line.

6. The combination of claim 1 together with a throttle valve disposed between said source of compressed air and said tank inlet to control the rate of flow of said binder material through said first hose line; and a second throttle valve disposed between said source of compressed air and said one end of said second hose line to control the rate of flow of air to and through said second hose line whereby the flow speeds of the respective streams of ingredients may be controlled.

7. The combination of claim 5 together with a further throttle valve at the outlet connection of said tank to further regulate the flow of said binder material.

8. A fiber feeding and proportioning mechanism for use in producing fiber reinforced products from binder materials by a continuous method comprising means for supplying continuous fibers of indeterminate length in the form of a rope-like strand; two sets of opposed paired driven feed roller and shaft assemblies arranged in spaced relation in a manner to successively drivingly engage said rope-like strand between said opposed paired rollers to draw said rope-like strand therebetween and feed the free end continuously to a point beyond said lastly engaged pair of driven feed rollers; a variable speed motor having a main power take-off gear adapted to be driven at a predetermined controlled speed; a gear train drivingly engaging said power take-off gear at one side thereof and comprising a first roller drive gear for driving one set of paired rollers, a transfer gear meshingly engaging said first roller drive gear and a second roller drive gear for driving the other set of paired rollers at a different speed; a swinging cutter assembly including a vertically adjustable support member having a splined mounting opening and an eccentrically disposed cutter support bracket mounting a light constant speed motor with its shaft journalled with its axis parallelling the axis of travel of said rope-like strand between said sets of paired rollers and carrying a rotary cutting element selectively swingable at right angles to said axis of travel of said rope-like strand in a predetermined plane between said sets of paired rollers; and a constant ratio reduction speed gear train drivingly engaging said power take-off gear at the side opposite said first mentioned gear train and including a splined power take-off shaft for adjustably cooperating with said vertically splined opening of said adjustable support member to mount said support member for rotation therewith whereby said rotary cutter swings in predetermined timed relation to the speed of feed of said rope-like strand to sever said strand while tensioned between said sets of feed rolls whereby a strand section of predetermined uniform length strands will be delivered to said point beyond said lastly engaged pair of rollers at a closely controlled rate of speed thereby assuring a supply of fiber in uniform controlled ratio to a supply of binder material.

9. A reinforced plastic article producing apparatus comprising a source of compressed air; means for supplying fibrous roving; a cutter mechanism including means for feeding roving from said source of supply to said cutting mechanism and cutters for cutting said roving into short lengths; air jet means connected to said source of compressed air and including laterally spaced jet openings arranged to direct jets of compressed air along angularly converging paths directed forwardly of said jet openings; means for passing said cut short lengths of roving between said jet openings and through said angularly converging jets of compressed air toward a predetermined point thereby effecting a separation of the fibres of said short lengths of roving by the action of said air jets playing against said severed roving lengths as they pass toward said predetermined point; a source of supply of plastic resin coating and binder material; means for forming a stream of plastic resin coating and binder material and directing said stream to said predetermined point in a manner to coat said separated fibres and entrain them in said stream and thereafter discharge said stream with its coated and entrained fibres at a point of deposit; and collecting means at said point of deposit to intercept said stream and its coated and entrained fibres and impart a desired form thereto as the plastic resin coating and binder cures in place on said collecting means.

References Cited in the file of this patent

UNITED STATES PATENTS

| | | |
|---|---|---|
| 2,230,396 | Addy et al. | Feb. 4, 1941 |
| 2,231,497 | Gajewski et al. | Feb. 11, 1941 |
| 2,343,887 | Crane et al. | Mar. 14, 1944 |
| 2,577,664 | Pro | Dec. 4, 1951 |
| 2,643,955 | Powers et al. | June 30, 1953 |
| 2,699,403 | Courts | Jan. 11, 1955 |

FOREIGN PATENTS

| | | |
|---|---|---|
| 606,093 | Great Britain | Aug. 5, 1948 |